(12) United States Patent
Ishizaki et al.

(10) Patent No.: US 6,499,555 B2
(45) Date of Patent: Dec. 31, 2002

(54) VEHICLE HOOD APPARATUS

(75) Inventors: Tatsuya Ishizaki, Wako (JP); Kazuo Matsuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,476

(22) Filed: Sep. 14, 2001

(65) Prior Publication Data

US 2002/0033294 A1 Mar. 21, 2002

(30) Foreign Application Priority Data

Sep. 19, 2000 (JP) .................................... 2000-284014

(51) Int. Cl.$^7$ ............................................... B60R 21/34
(52) U.S. Cl. ..................................... 180/274; 180/69.21
(58) Field of Search .............................. 180/274, 281, 180/271, 69.21; 296/194, 189

(56) References Cited

U.S. PATENT DOCUMENTS 6,182,782 B1 * 2/2001 Matsuura et al. ........... 180/274
6,217,108 B1 * 4/2001 Sasaki ........................ 180/274
6,293,362 B1 * 9/2001 Sasaki et al. ................ 180/274
6,332,115 B1 * 12/2001 Nobusawa et al. ......... 180/274
6,364,402 B1 * 4/2002 Sasaki ..................... 180/69.21

FOREIGN PATENT DOCUMENTS

| JP | 11-115680 A | * | 4/1997 |
| JP | 11028994 | | 2/1999 |
| JP | 11-99906 A | * | 4/1999 |
| WO | WO 00/69707 | * | 11/2000 |

* cited by examiner

Primary Examiner—Paul N. Dickson
Assistant Examiner—Ruth Ilan
(74) Attorney, Agent, or Firm—Merchant & Gould P.C.

(57) ABSTRACT

When a vehicle collides with an object and the object is thereby thrown into impact on a hood of the vehicle, a vehicle hood apparatus detects the collision and causes actuators attached to the vehicle to operate to lift up a rear end of a hood of the vehicle so as to reduce the impact of the object thereon. The apparatus include a control unit for controlling the actuators. The control unit includes a hood lock determination means for determining whether a hood lock locks a front end of the hood in place. When the hood lock is in an unlocking state, the control unit prevents the actuators from operating. When the hood lock is in a locking state, the control unit operates the actuators.

2 Claims, 8 Drawing Sheets

| STATE OF HOOD LOCK SENSOR | | DETERMINATION OF CONTROL UNIT |
|---|---|---|
| CONTACT A | CONTACT B | |
| ON | OFF | HOOD LOCK (LOCKING STATE) |
| OFF | ON | HOOD LOCK (UNLOCKING STATE) |
| OFF | OFF | OUT OF ORDER |
| ON | ON | OUT OF ORDER |

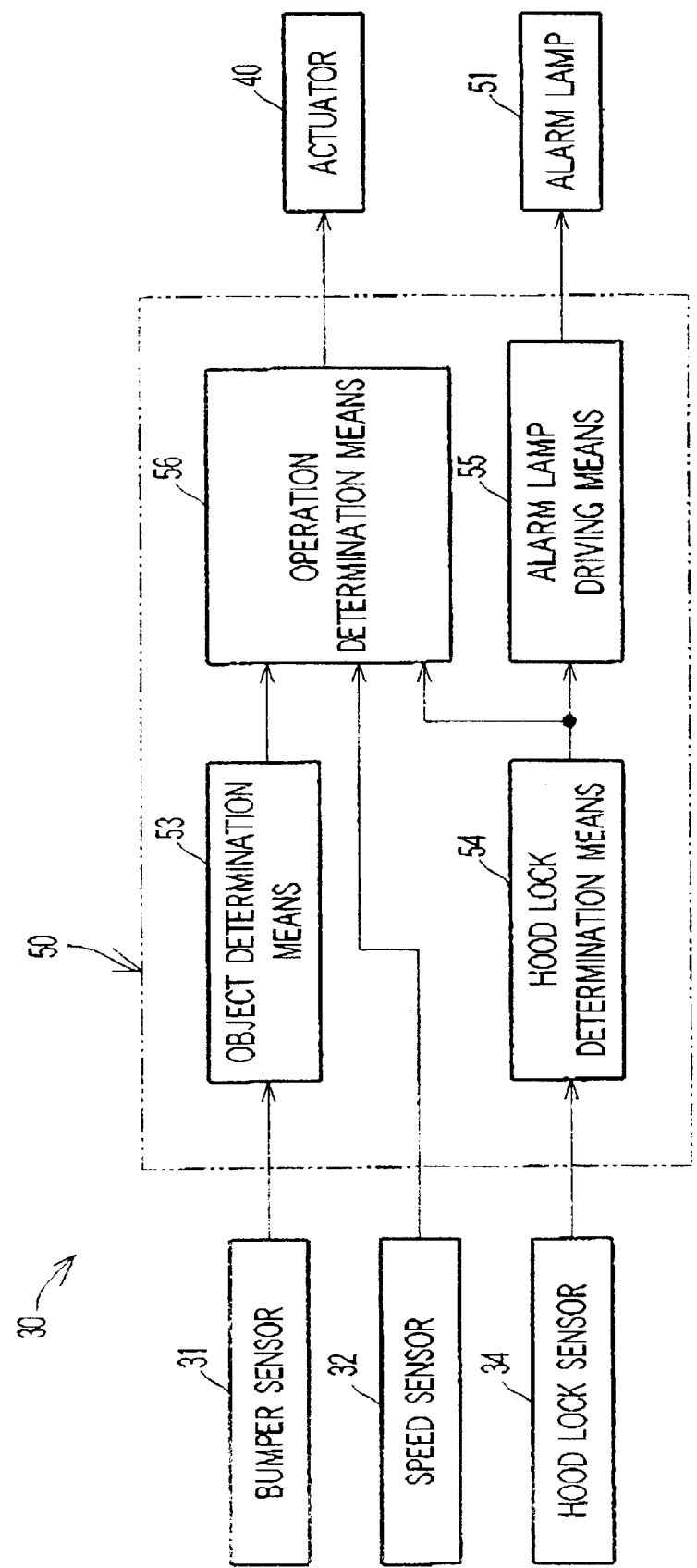

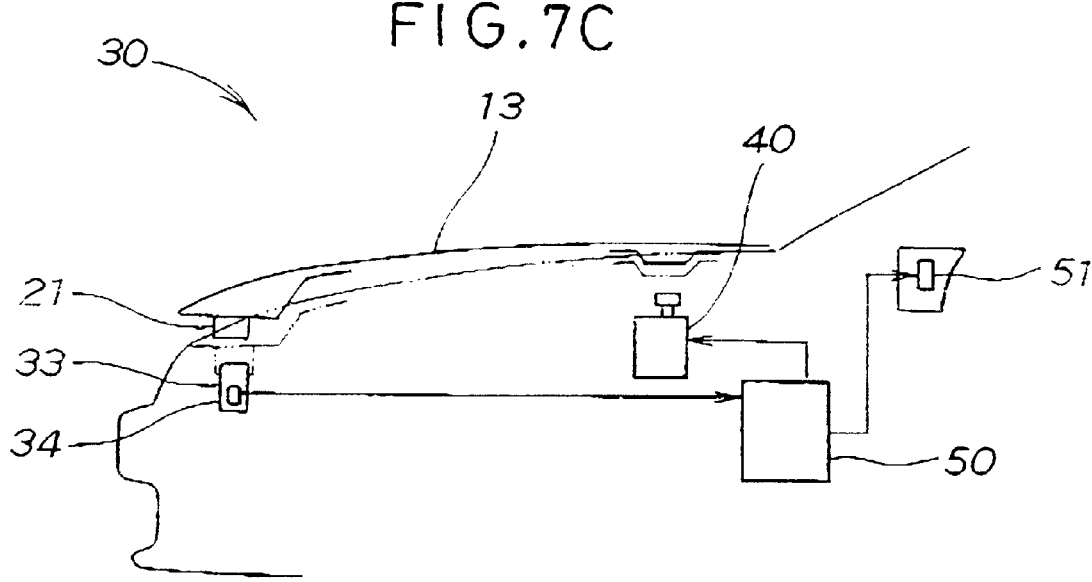
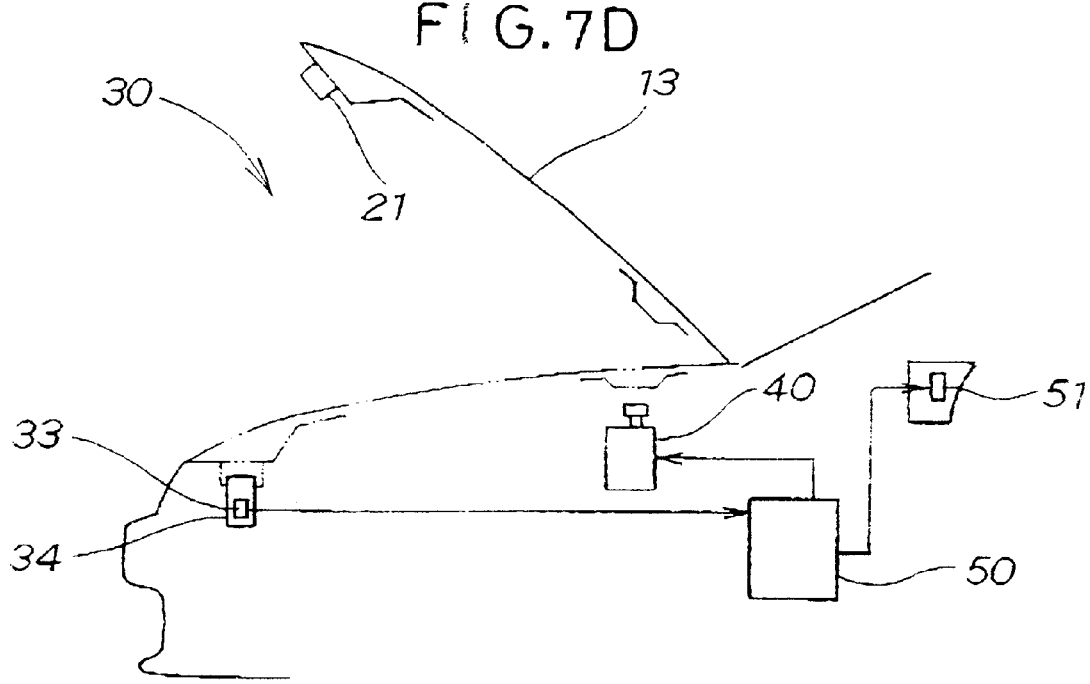

VEHICLE HOOD APPARATUS

BACKGROUND OF THE INVENTION

1. Field of the Invention

The present invention relates to a vehicle hood apparatus designed to detect collision of a vehicle with an object and then operate an actuator attached to the vehicle, such that a hood of the vehicle is lifted up to absorb impact of the object thereon occurred subsequently to the collision.

2. Description of the Related Art

Vehicle hood apparatuses are known in the art. These types of apparatuses are disclosed in, for example, Japanese Patent Laid-Open Publication No. HEI-11-28994 entitled "SENSOR SYSTEM FOR PROTECTING PEDESTRIAN".

The disclosed sensor system includes a lift mechanism, a detection means for detecting the presence of a pedestrian, a speed sensor for detecting a speed of a vehicle, and a controller for controlling the lift mechanism on the basis of information transmitted from the detecting means and speed sensor thereto. When the pedestrian is hit by a vehicle and thereby thrown into impact on a hood of the vehicle, the lift mechanism lifts up a hood of the vehicle to reduce the impact of the pedestrian thereon. The detection means is mounted at a front bumper of the vehicle.

When serviced, the vehicle with the hood opened travels on a test bed. At this time, an operator may unintentionally contact or strike the detection means with tools to thereby undesirably operate the sensor system.

The system is preferably operated with the hood fully closed.

SUMMARY OF THE INVENTION

An object of the present invention is to provide a vehicle hood apparatus which can be advantageously operated identifying a state of the hood of the vehicle.

According to an aspect of the present invention, there is provided a vehicle hood apparatus designed to detect collision of a vehicle with an object and operate actuators attached to the vehicle, such that a hood of the vehicle is lifted up to absorb impact of the object thereon occurred subsequently to the collision, the apparatus comprising; (a) a hood lock for locking a front end of the hood to a vehicle body of the vehicle; (b) a hood lock sensor for detecting a locking/unlocking state of the hood lock; and (c) a control unit for controlling the actuators on the basis of information transmitted from the hood lock sensor; the control unit including: (i) a hood lock determination means for determining the state of the hood lock; and (ii) an alarm lamp driving means for driving an alarm lamp provided in the vehicle when the hood lock determination means determines that the hood lock is in the unlocking state.

The vehicle hood apparatus of the present invention detects the collision of the vehicle with the object. Subsequently, the control unit of the apparatus operates the actuators to thereby lift up the hood of the vehicle. At this time, the apparatus preferably identifies the state of the hood lock provided for locking the front end of the vehicle body. When the vehicle is serviced with the hood opened, the vehicle hood apparatus need not be operated. Further, the hood apparatus could be improperly operated if the hood lock incompletely locks the hood (i.e., the hood lock is in the unlocking state). When the hood lock is held in the locking state (i.e., the hood lock locks the hood in place), the apparatus is properly operated. Therefore, the control unit is required to identify the locking/unlocking state of the hood lock for effective operation of the vehicle hood apparatus. To accomplish this, the control unit is provided with the hood lock determination means for determining the state of the hood lock. When the hood lock determination means determines that the hood lock is in the unlocking state, the alarm lamp driving means is operated to turn the alarm lamp on. The thus arranged vehicle hood apparatus is effectively or advantageously operated.

Preferably, the control unit further includes an operation determination means for determining whether the actuators are caused to operate, the operation determination means preventing the actuators from operating when the hood lock is in the unlocking state.

When the hood lock is in the unlocking state, the vehicle hood apparatus need not or should not be operated. In such a case, the apparatus is not operated. Thus, the function of the vehicle hood apparatus is not impaired.

BRIEF DESCRIPTION OF THE DRAWINGS

A certain preferred embodiment of the present invention will hereinafter be described in detail, by way of example only, with reference to the accompanying drawings, in which;

FIG. 6 is a block diagram showing how the control unit is electrically operated;

FIGS. 7A to 7D show the actuator which is operated depending upon relations between a hood of the vehicle and a hood lock of the vehicle hood apparatus;

DETAILED DESCRIPTION OF THE PREFERRED EMBODIMENT

The following description is merely exemplary in nature and is in no way intended to limit the invention or its application or uses.

Figure 1:
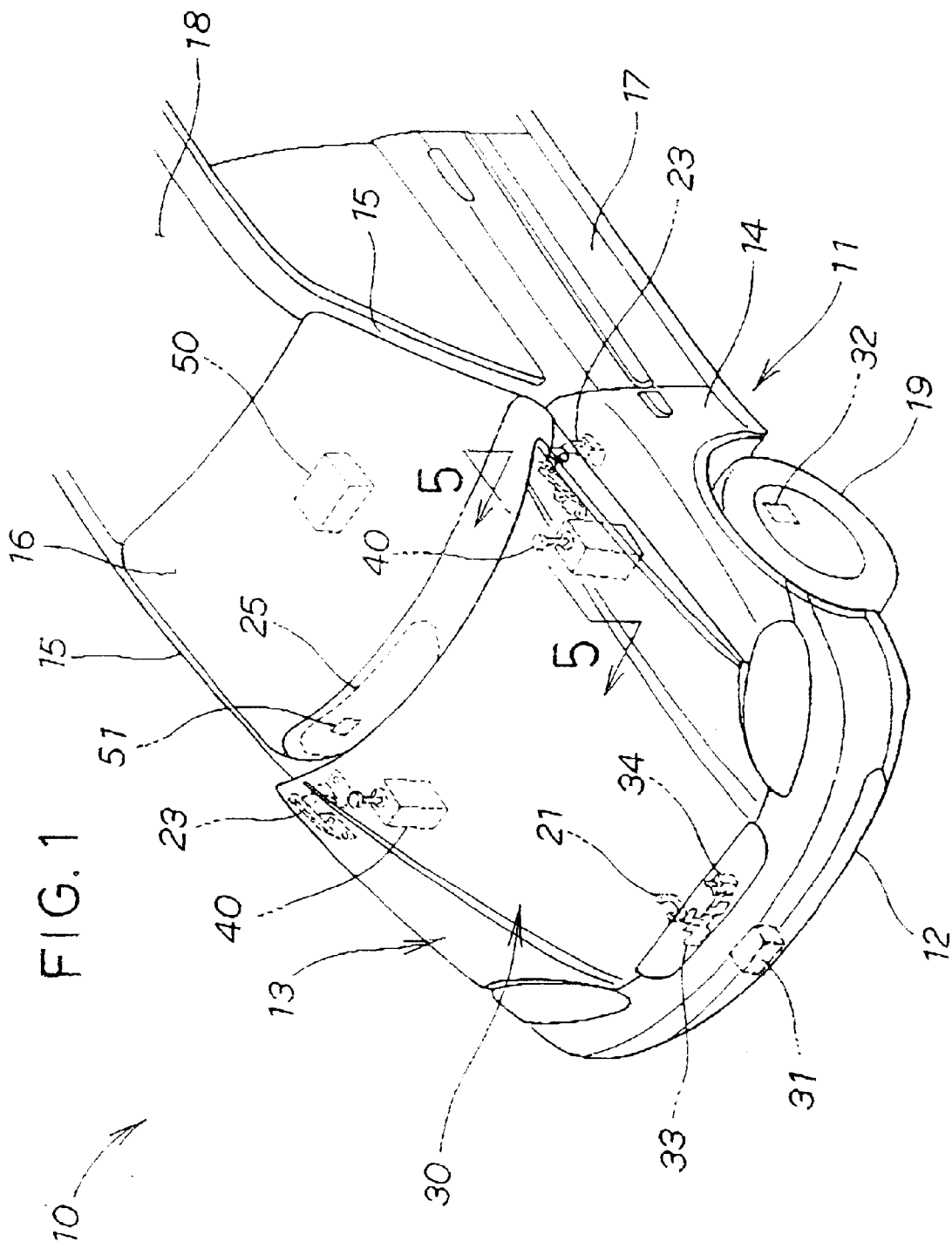
FIG. 1 is a perspective view illustrating a front part of a vehicle employing a vehicle hood apparatus according to the present invention.

Referring to FIG. 1, a vehicle is shown generally at 10. The vehicle 10 includes a vehicle body 11, a front bumper 12, a hood 13, a windshield 16, front wheels 19, 19 (only one shown) and an instrument panel 25. The hood 13 has a striker 21 mounted at a front end thereof. The hood 13 is pivotable on hinges 23, 23 between an opened position and a closed position. The vehicle 10 further includes a vehicle hood apparatus 30 and actuators 40, 40 for lifting up the hood 13. The apparatus 30 has a hood lock 33 for locking the striker 21 in place and a control unit 50 as will be described.

Figure 2:
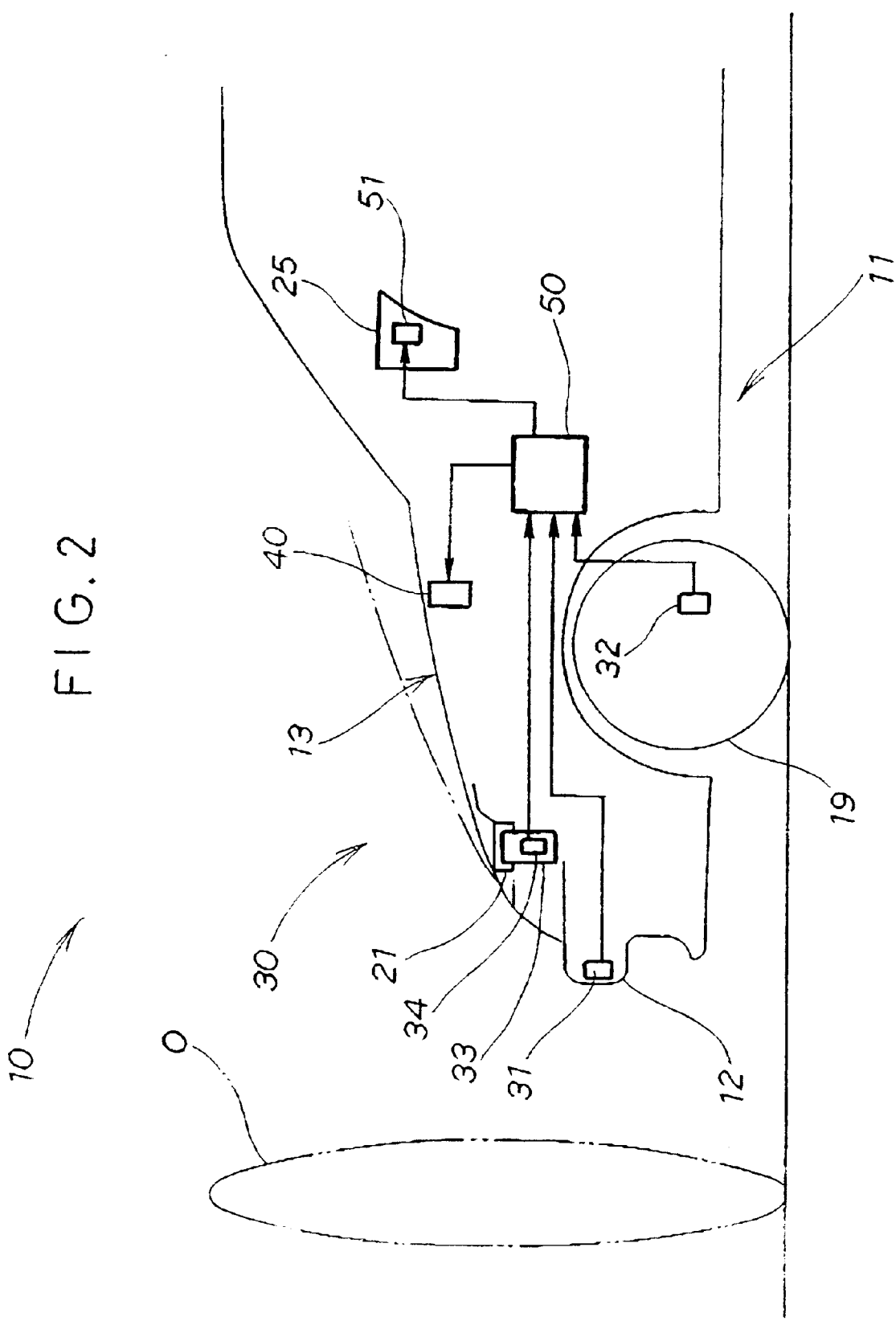
FIG. 2 is a schematic view of the vehicle hood apparatus.

With respect to FIG. 2, the apparatus 30 comprises a bumper sensor 31 provided at the front bumper 12, a speed sensor 32 for detecting a speed or velocity of the vehicle 10, the hood lock 33 for locking the striker 12 of the hood 13 in place, a hood lock sensor 34 for detecting a locking/unlocking state of the hood lock 33, the control unit 50 for controlling the actuators 40, 40 on the basis of pieces of information transmitted from the bumper sensor 31, the speed sensor 32, and the hood lock sensor 34 thereto, and an alarm lamp 51 controlled by the control unit 50. The bumper sensor 31 is designed to detect an object O. The alarm lamp 51 is provided at the instrument panel 25.

When the front bumper 12 of the vehicle 10 hits or collides with the object O at a higher speed, detected by the sensor 32, than a predetermined speed and the object O is thereby thrown into impact on the hood 13, the control unit 50 of the apparatus 30 brings the actuators 40, 40 into operation. The actuators 40, 40 thus operated lift up the hood 13 to absorb the impact of the object O thereon. The hood lock sensor 34 is provided at the hood lock 33. The alarm lamp 51 is provided at the instrument panel 25. on the basis of information transmitted from the hood lock sensor 34, the control panel 50 turns the lamp 51 on, thereby indicating the state of the hood lock 33.

The bumper sensor 31 preferably functions to detect acceleration of the vehicle 10. The speed sensor 32 is a photocoupler for detecting the number of times the front wheels 19, 19 rotate.

Figures 3, 4:
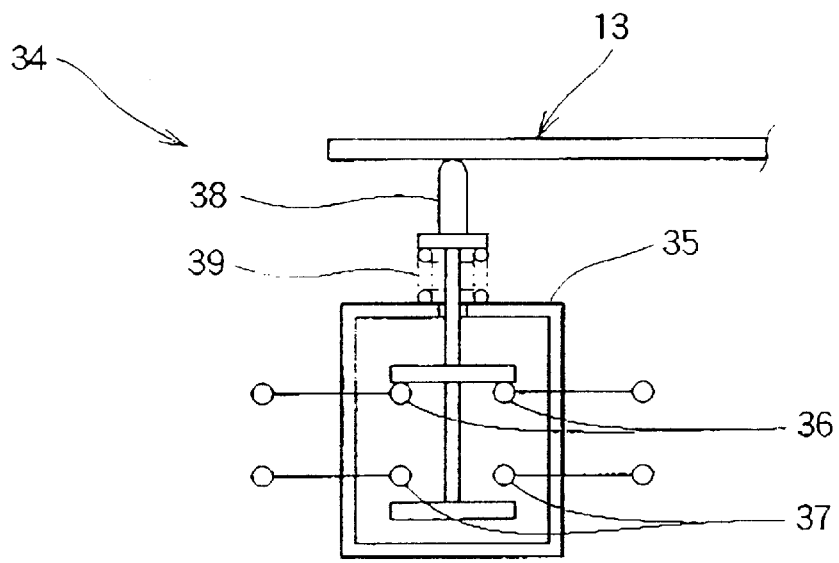
FIG. 3 is a cross-sectional view of an exemplary hood lock sensor of the vehicle hood apparatus of FIG. 2.
FIG. 4 is a view showing determination made by a control unit of the vehicle hood apparatus on the basis of a state of the hood lock sensor.

As shown in FIG. 3, the hood lock sensor 34 is a switch having two pairs 36, 37 of contacts A, A, B, B. The sensor 34 includes a housing 35, a mover 38 having a lower part movable into and out of contact with the pairs 36, 37 of contacts A, A, B, B, and a compression spring 39 urging the mover 38 towards the hood 13. Both the pair 36 of contacts A, A and the pair 37 of contacts B, B are provided within the housing 35. Discussion will be made as to how the control unit 50 identifies the state of the hood lock 33.

With reference to FIG. 4, when the lower part of the mover 38 is in contact with the pair 36 of contacts A, A (the pair 36 of contacts A, A is in an ON state) and is out of contact with the pair 37 of contacts B, B (the pair 37 of contacts B, B is in an OFF state), the control unit 50 determines that the hood lock 33 is in a locking state. Conversely, when the lower part of the mover 38 is out contact with the pair 36 of contacts A, A (the pair 36 of contacts A, A is in an OFF state) and is in contact with the pair 37 of contacts B, B (the pair 37 of contacts 8, B is in an ON state), the control unit 50 determines that the hood lock 33 is in an unlocking state. When the pair 36 of contacts A, A is in the OFF state while the pair 37 of contacts B, B is in the OFF state, the control unit 50 determines that the hood lock 33 is out of order. Similarly, when the pair 36 of contacts A, A is in the ON state while the pair 37 of contacts B, B is in the ON state, the control unit 50 determines that the hood lock 33 is out of order. By the term "unlocking state" as used herein, it is meant that the striker 21 incompletely or improperly engages the hood lock 33 or otherwise the hood 13 is in a full opened position.

Figure 5:
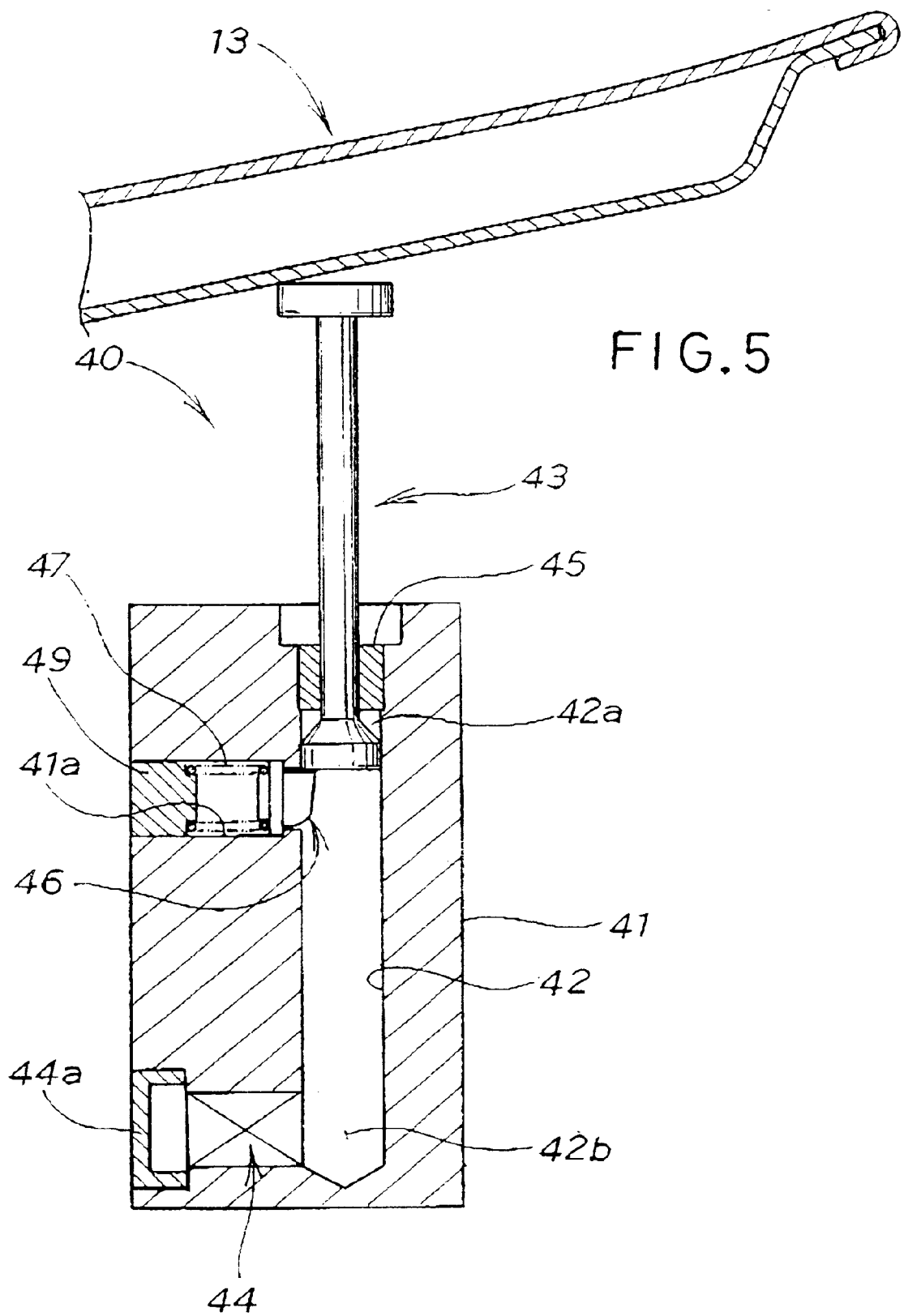
FIG. 5 is an enlarged cross-sectional view of an actuator taken along line 5—5 of FIG. 1.

Referring to FIG. 5, the actuator 40 is shown having an actuator block 41 attached to the vehicle body 11, a piston pin 43, a gas generator 44, a piston stop member 45, and a stopper piece 46. The actuator block 41 has a cylindrical space portion 42 formed therein The piston pin 43 is sized to be inserted into the cylindrical space portion 42 through one end 42a of the cylindrical space portion 42. The gas generator 44 is positioned adjacent another end 42b of the cylindrical space portion 42. The piston stop member 45 is mounted at the one end 42a of the cylindrical space portion 42. The stopper piece 46 is usually urged by a compression spring 47 in such a manner as to project into the cylindrical space portion 42. The gas generator 44 is designed to cause the piston pin 43 to move upwardly at a high speed within the cylindrical space portion 42. The piston stop member 45 is designed to prevent the piston pin 43 from moving out of the cylindrical space portion 42. When the upward movement of the piston pin 43 is stopped by the piston stop member 45, as shown in FIG. 5, the projecting stopper piece 46 prevents the piston pin 43 from moving downwardly.

A bushing 49 bears the compression spring 47. The actuator block 41 has a reception portion 41a formed therein. The reception portion 41a is sized to receive all the stopper piece 46, the compression spring 47, and the bushing 49.

Reference is made to FIG. 6. The control unit 50 comprises an object determination means 53, a hood lock determination means 54, an alarm lamp driving means 55, and an operation determination means 56. The object determination means 53 is designed to determine that the vehicle 10 collides with the object O on the basis of information transmitted from the bumper sensor 31. The hood lock determination means 54 determines the state of the hood lock 33 on the basis of information sent from the hood lock sensor 34. on the basis of the determination made by the means 54, the alarm lamp driving means 55 turns the alarm lamp 51 on. The operation determination means 56 determines whether or not the actuators 40, 40 are caused to operate on the basis of the determinations made by the means 53, 54 and the information transmitted from the sensor 32.

The vehicle hood apparatus 30 is designed to detect collision of the vehicle 10 with the object O and then cause the actuators 40, 40 to operate to lift up the hood 13. At this time, the control unit 50 preferably determines whether the hood lock 33 locks the striker 21 of the hood 13 in place so as to achieve effective operation of the vehicle hood apparatus 30.

In the illustrated embodiment of the present invention, the control unit 50 includes the means 54 for determining the state of the hood lock 33. when the means 54 determines that the hood lock 33 is in the unlocking state, the means 55 operates the alarm lamp 51. Provision of the means 54 enables effective or advantageous operation of the vehicle hood apparatus 30.

The vehicle hood apparatus 30 need not be operated when the hood lock 33 is in the unlocking state. The control unit 50 includes the means 56 for determining whether the actuators 40, 40 are caused to operate. The operation determination means 56 prevents the actuators 40, 40 from operating when the hood lock 33 is in the unlocking state. This arrangement has the advantage that the apparatus 30 is not operated when not required. It is therefore unlikely that the function of the vehicle hood apparatus 30 is impaired.

Discussion will be made as to how the vehicle hood apparatus 30 operates with reference to FIGS. 7A through 7D.

Figure 7A:
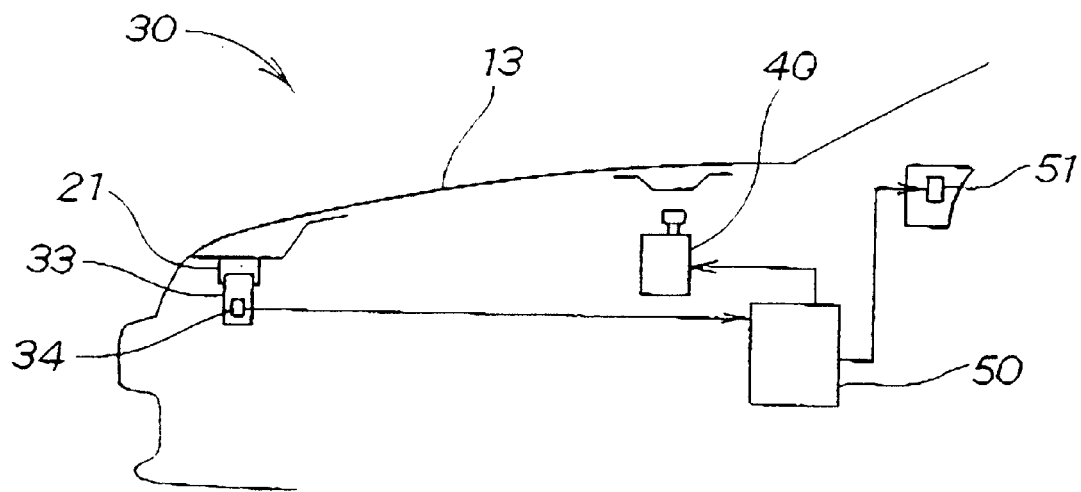
Figure 7B:
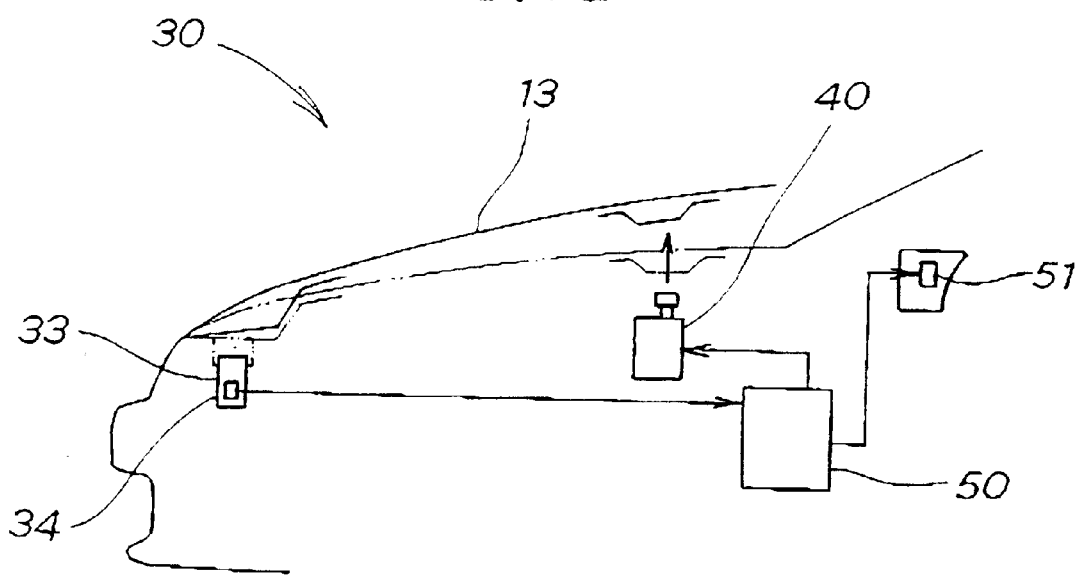

Referring to FIG. 7A, the hood lock 33 properly or completely engages the striker 21 of the hood 13. The hood lock sensor 34 generates a signal indicating that the hood lock 33 is in the locking state. On the basis of the signal output from the sensor 34, the control unit 50 identifies the hood lock 33 as being in the locking state. With this arrangement, the operation determination means 56 of the control unit 50 causes the actuators 40, 40 to operate to lift the hood 13, as shown by an arrow of FIG. 7B.

With respect to FIG. 7c, the striker 21 of the hood 13 is spaced from the hood lock 33. The hood lock sensor 34 outputs a signal to the control unit 50. By receiving the signal output from the sensor 34, the control unit 50 identifies the hood lock 33 as being in the unlocking state. More specifically, the hood lock determination means 54 (see FIG. 6) of the unit 50 determines that the hood lock 33 is in the unlocking state, whereupon the alarm lamp driving means 55 turns the alarm lamp 51 on. At the same time, the operation determination means 56 prevents the actuators 40, 40 from operating.

As shown in FIG. 7D, the hood 13 is in the opened position. The control unit 50 identifies the unlocking state of the hood lock 33 in the manner as described with reference to FIG. 7C. The alarm lamp 51 is then turned on and hence the actuators 40, 40 do not operate, as stated above.

Figure 8:
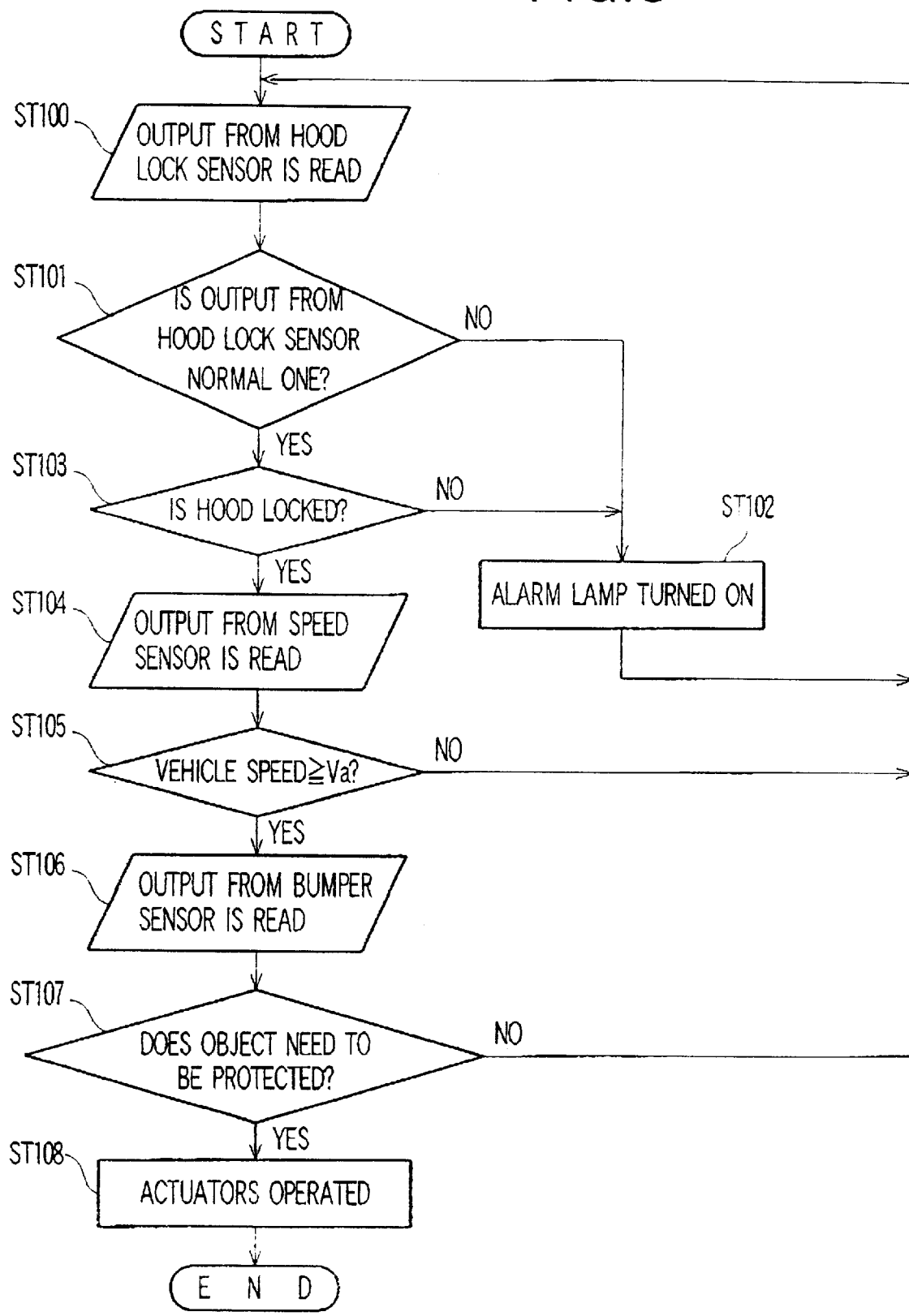
FIG. 8 is a flow chart illustrating how the control unit is operated.

With reference to FIG. 8, description will be made as to how the control unit 50 is operated.

STEP (hereinafter simply "ST") 100: The control unit 50 reads a signal output from the hood lock sensor 34.

ST101: Determination is made as to whether the output signal is normal one. When it is NO (the hood lock 33 is out of order as shown in FIG. 4), the operation of the unit 50 proceeds to ST102. When it is YES, the operation of the unit 50 proceeds to ST103.

ST102: The alarm lamp 51 is turned on.

ST103: Determination is made as to whether the hood 13 is locked in place. In other words, determination is made as to whether the hood lock 33 is in the locking state. When it is NO (the hood lock 33 is in the unlocking state), the operation of the unit 50 proceeds to ST102. When it is YES (the hood lock 33 is in the locking state), the operation of the unit 50 proceeds to ST104.

ST104: The control unit 50 reads a signal output from the speed sensor 32.

ST105: Determination is made as to whether the speed of the vehicle exceeds a threshold vehicle speed Va. When it is NO, the operation of the unit 50 is returned to ST100. When it is YES, the operation of the unit 50 proceeds to ST106.

ST106: The control unit 50 reads a signal output from the bumper sensor 31. Such a signal indicates that the front bumper 12 hits or collides with the object O.

ST107: The object determination means 53 determines whether the object O needs to be protected. More specifically, such a determination is made using the following characteristics of the bumper sensor 31 and the speed sensor 32: (1) If the object O is lightweight or need not be protected, the level of a signal output from the bumper sensor 31 is low. (2) The bumper sensor 31 outputs a signal greater in level if the object O needs to be protected than if the object O is lightweight. (3) If the object O is a structure such as a building or need not be protected, the vehicle 10 is abruptly changed in speed upon hitting the object O. When it is NO (the object O need not be protected), the operation of the unit 50 is returned to ST100. When it is YES (the object O needs to be protected), the operation of the unit 50 proceeds to ST108.

ST108: The actuators 40, 40 are operated.

In the illustrated embodiment, the alarm lamp 51 is turned on by the alarm lamp driving means 55. however, the alarm lamp 51 may be a buzzer while the alarm lamp driving means 55 may be a buzzer driving means. In addition to the lamp 51, any types of devices may be used to indicate to a driver that the signal output from the hood lock sensor 34 is not normal one and that the hood lock 33 is in the unlocking state.

Obviously, various minor changes and modifications of the present invention are possible in the light of the above teaching. It is therefore to be understood that within the scope of the appended claims, the present invention may be practiced otherwise than as specifically described.

What is claimed is:

1. A vehicle hood apparatus designed to detect collision of a vehicle with an object and operate actuators attached to the vehicle, such that a hood of the vehicle is lifted up to absorb impact of the object thereon occurred subsequently to the collision, the apparatus comprising;

(a) a hood for locking a front end of the hood to a vehicle body of the vehicle;

(b) a hood lock sensor for detecting a locking/unlocking state of said hood lock; and (c) a control unit for controlling the actuators on the basis of information transmitted from said hood lock sensor;

said control unit including:

(i) a hood lock determination means for determining the state of said hood lock; and (ii) an alarm lamp driving means for driving an alarm lamp provided in the vehicle when said hood lock determination means determines that said hood lock is in the unlocking state.

2. A vehicle hood apparatus according to claim 1, wherein said control unit further includes an operation determination means for determining whether the actuators are caused to operate, said operation determination means preventing the actuators from operating when said hood lock is in the unlocking state.

* * * * *